United States Patent Office 3,100,802
Patented Aug. 13, 1963

3,100,802
ARALKYL POLYTHIOETHERS
Walter Reifschneider, Midland, Mich., assignor to The Dow Chemical Company, Midland, Mich., a corporation of Delaware
No Drawing. Filed June 27, 1962, Ser. No. 205,518
4 Claims. (Cl. 260—609)

The present invention is directed to thioethers and in particular is directed to novel thioethers corresponding to the formula

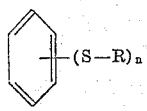

In the present specification and claims, R represents an alkyl group of from 1 to 5, inclusive, carbon atoms and $n$ is an integer from 3 to 6, inclusive.

The novel compounds are colorless to light-colored crystalline solids or oily liquids. They are very slightly soluble in water but readily soluble in various common organic solvents such as lower alkanols, benzene and the like. The compounds are useful as parasiticides and herbicides for the control of a number of insect and fungal species such as Cabomba and flies. The compounds are also useful as additives to improve the properties of lubricating oils especially designed for operation under high pressures and temperatures; they are useful as intermediates in the preparation of dye-stuffs and biologically active materials; they are also of value as solvent additives in the modification of behavior of mixed solvent systems.

The compounds can be prepared by a process which comprises the step of causing a reaction between an aromatic halide compound corresponding to the formula

wherein X represents halogen, and a mercaptan compound corresponding to the formula

G—S—R wherein G is selected from hydrogen and copper (I). During the reaction to prepare the present compounds, $n$ molecules of mercaptan compound react with each molecule of aromatic halide. Small amounts of mercaptan may be lost in side reactions. Thus, when it is desired to prepare the present compound in a high state of purity and with minimum post-synthesis purification, the starting reactants should be employed in stoichiometric proportions, or preferably, with the mercaptan in slight excess. However, other proportions may be employed if desired, and unconsumed starting material of whatever identity may, if desired, be recycled into further synthesis process.

The reaction goes forward at temperatures over a wide range, such as from 15° C. to 350° C. but initiates most readily when heated to a temperature somewhat higher than room temperature; loss of product may occur at temperatures near the stated upper limit: at mid-range temperatures such as 80° to 180° C., the reaction is, in general, exothermic and goes forward to completion with good yield calculated upon the basis of consumed starting material. Hydrogen halide of reaction is evolved and means for its orderly disposal are advantageously provided.

Typically, in the preparation of the compounds of the present invention, reaction between the mercaptan starting material and the aromatic halide starting material will initiate and go forward only when there are employed, as catalytic agent, simultaneously, a catalytic amount of both a source of cuprous ion and a nitrogenous base. Thus, in the preparation of many, and probably all of the present compounds, the employment of such catalyst is essential and critical, although the actual quantity is not critical. Certainly the employment of such catalyst is in all cases highly advantageous. The source of cuprous ion can be metallic copper, in which case the copper reacts in some way to obtain cuprous halide. Also, cuprous oxide can be employed as a source of cuprous ion in which case water of reaction is evolved and cuprous halide results. Cuprous chloride itself or other cuprous salt can be employed. When cuprous mercaptide is employed as starting material, or as a significant component of such starting material, no other source of cuprous ion is usually needed. The employed quantity, as copper, can vary from a very small trace amount, less than $\frac{1}{100}$ of 1 mole percent, to as much as an amount equimolecular with either reactant or even greater. In general, the employement of larger amounts is accompanied by no major advantage and, being expensive, is preferred only when the cuprous mercaptide is easier to handle than is the uncombined mercaptan.

The nitrogenous base can be ammonia, a primary, secondary, or tertiary aliphatic or aromatic amine or a nitrogenous heterocycle which acts as a basic substance. If desired, the nitrogenous base can be a naturally liquid substance which is employed as a reaction medium. Otherwise, such base is dissolved in inert liquid reaction medium, such as aromatic or aliphatic hydrocarbons.

It is preferred at least in small laboratory preparations, to employ the nitrogenous base catalyst substance in sufficient amount that portions of it can also act as hydrogen halide acceptor and yet further portions can continue to function, unreacted, in the necessary catalytic manner.

In order to cause the reaction to prepare the compounds of the present invention, the aromatic halide and the mercaptan are intimately mixed and blended, in any order and in desired amounts, with source of cuprous ion and nitrogenous base as hereinbefore described, preferably in liquid reaction medium; and thereafter heated to a temperature at which reaction goes forward promptly. In one convenient method of practicing the present method, the reaction temperature can be the boiling temperature of liquid reaction mixture. In this situation, heating can be continued at the boiling temperature of the reaction mixture and under reflux for a period of time to carry the reaction to completion.

Upon completion of the reaction, the desired compounds of the present invention are separated in manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate usually forms from which the desired product can be extracted as a solvent-soluble fraction. Representative extraction solvents include diethyl ether, chlorinated hydrocarbons, and benzene. In any event the precipitate or mixture resulting from reaction is extracted with solvent, the solvent extract dried over an inert drying agent such as, for example, anhydrous potassium carbonate or the like; the solvent vaporized and removed. The remaining product can be chilled or otherwise induced to crystallize and, if desired, recrystallized from a solvent such as a lower alkanol: or if normally liquid it can be fractionally distilled under declining subatmospheric pressures and at gradually rising temperatures.

When production of the present compounds is to be carried out on an industrial scale, various other methods of separation and purification may be preferred, including, for example, centrifugation, decantation, vacuum distillation, and the like.

The following examples, without more, will enable those skilled in the art to practice the present invention.

EXAMPLE I

*1,2,4-Tris(Ethylthio)Benzene*

A mixture of 157.4 grams (0.5 mole) of 1,2,4-tribromobenzene, 180 grams (2 moles) sodium ethylmercaptide, 30 grams cuprous bromide and 500 milliliters technical 2,4-lutidine was stirred and heated under reflux for 30 hours. The lutidine served both as liquid reaction medium and as nitrogenous base. Upon the completion of the said heating and stirring, the mixture was poured into flaked ice in 600 milliliters concentrated hydrochloric acid. The resulting mixture was allowed to stand overnight and then extracted with ether, the resulting ether solution removed and washed once with 10 percent hydrochloric acid and thereafter dried over anhydrous potassium carbonate. The ether solvent was then vaporized and removed, leaving an oily 1,2,4-tris(ethylthio)benzene product which was subsequently further purified by distillation in vacuum to obtain 120.5 grams of a yellowish oily liquid boiling at 136°–138° C. under 0.2 millimeter mercury pressure, absolute.

EXAMPLE II

In procedures generally similar to the foregoing, employing a molecular amount of 1,2,4,5-tetrabromobenzene, and sodium ethylmercaptide in 4 times the molecular equivalent amount with the bromobenzene compound together with a catalytic amount of cuprous bromide in 2,4-lutidine as both liquid reaction medium and nitrogenous base, there was prepared 1,2,4,5-tetrakis(ethylthio)benzene. The compound is a white, crystalline solid melting at 66.5–68.5° C.

In procedures essentially the same as the foregoing, by the use of appropriate starting materials, other products of the present invention are prepared as follows:

From 1,2,4-trichlorobenzene and an excess above 3 molecular proportions of n-amylmercaptan, in the presence of cuprous oxide and in liquid lutidine-quinoline mixture, 1,4,6-tris(n-amylthio)benzene.

From 1,3,5-triiodobenzene and 3 molecular proportions of ethylmercaptan, in the presence of cuprous lactate and in a propanol solution of secondary n-butylamine, 1,3,5-tris(ethylthio)benzene.

From 1,3,4-trichlorobenzene and an excess above 3 molecular proportions of cuprous methylmercaptide in liquid N,N-dipentylxylidine, 1,3,4-tris(methylthio)benzene.

From 1,2-dichloro-4-bromobenzene, and firstly, 1 molecular proportion of ethylmercaptan and, secondly, an excess over 2 molecular proportions of normal butylmercaptan, in the presence of cuprous acetate and aniline, 1-ethylthio-3,4-bis(n-butylthio)benzene. The ethylmercaptan is chilled over ice until shortly before use.

From 1,2,4,6-tetrafluorobenzene and an excess above 4 molecular proportions of n-propylmercaptan, in a liquid lutidine-quinoline mixture in the presence of cuprous bromide, 1,2,4,6-tetrakis(n-propylthio)benzene.

From pentabromobenzene and 5 molecular proportions of n-ethylmercaptan, in the presence of cupric oxide and in a pyridine-collidine mixture, a pentakis(n-ethylthio)benzene.

The contents of the present invention are useful as parasiticides and herbicides for the control of a number of species of pests. In such use they are mixed with a finely divided solid and resulting composition employed as a dust. If desired, such dust composition can be dispersed in water with the aid of a surface active agent and the resulting dispersion employed as a spray. In other procedures the compounds can be employed in organic liquids, in oil-in-water or water-in-oil emulsions or in aqueous dispersions with or without the addition of surface active dispersing agents. In representative operations aqueous compositions containing two percent by weight of hexakis(ethylthio)benzene gave complete kill of flies. In other operations aqueous compositions containing 500 parts per million by weight of 1,2,4-tris-(ethylthio)benzene and 1,2,4,5 - tetrakis(ethylthio)benzene gave substantially complete control of Cabomba.

The mercaptans necessary as starting materials in the practice of the present invention are, for the most part, articles of commerce. However, those which are not can readily be prepared in known procedures such as, for example, the method of Pieverling. See Liebig's Annalen der Chemie, volume 183, pages 344–359, note especially page 349 and following. Other methods are well known to those skilled in the art.

I claim:

1. A compound corresponding to the formula

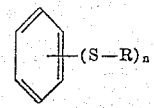

wherein R represents an alkyl group containing from 1 to 5, inclusive, carbon atoms and *n* is an integer from 3 to 6, inclusive.

2. 1,2,4-tris(ethylthio)benzene.
3. 1,3,5-tris(ethylthio)benzene.
4. Hexakis(ethylthio)benzene.

No references cited.